A. D. NORTHRUP.
FINDER ATTACHMENT FOR FOLDING CAMERAS.
APPLICATION FILED SEPT. 25, 1917.
1,264,842.
Patented Apr. 30, 1918.
2 SHEETS—SHEET 1.
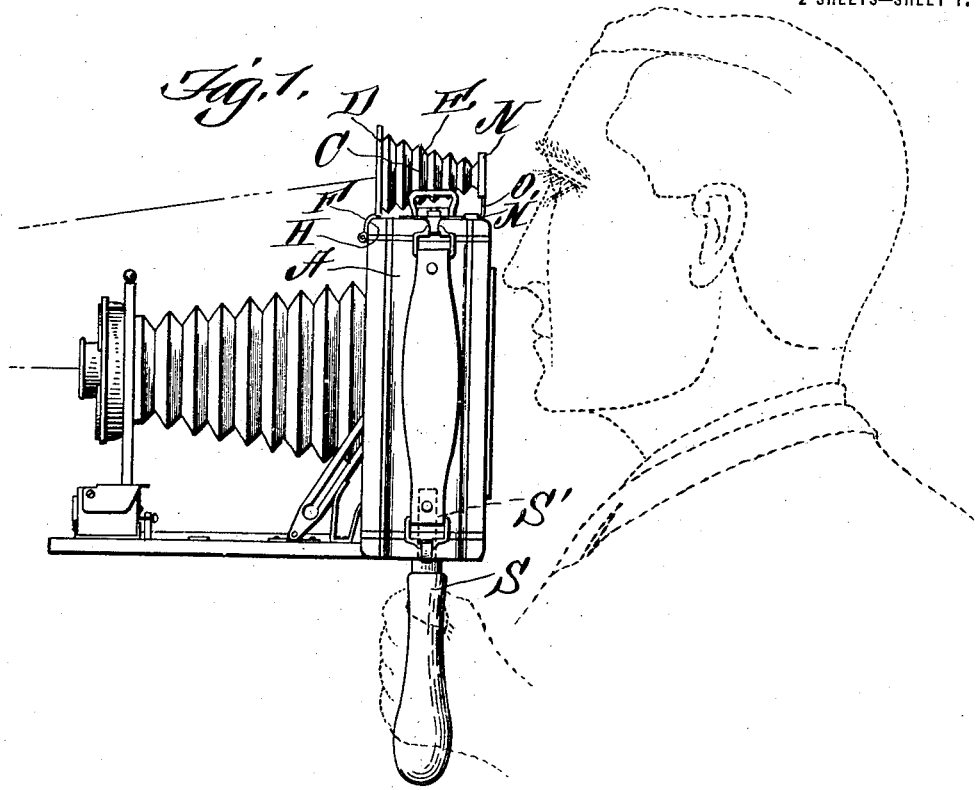
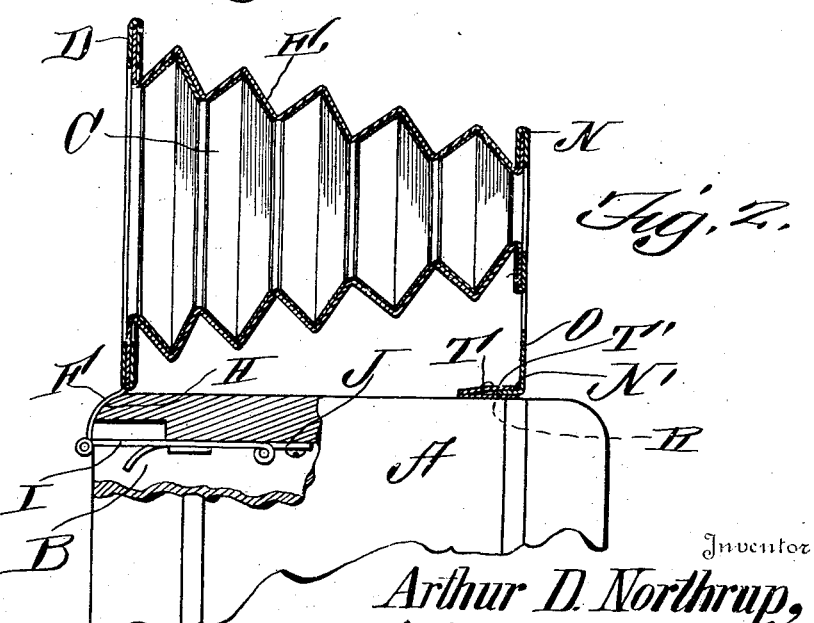
Witnesses
Inventor
Arthur D. Northrup,
By
Attorney

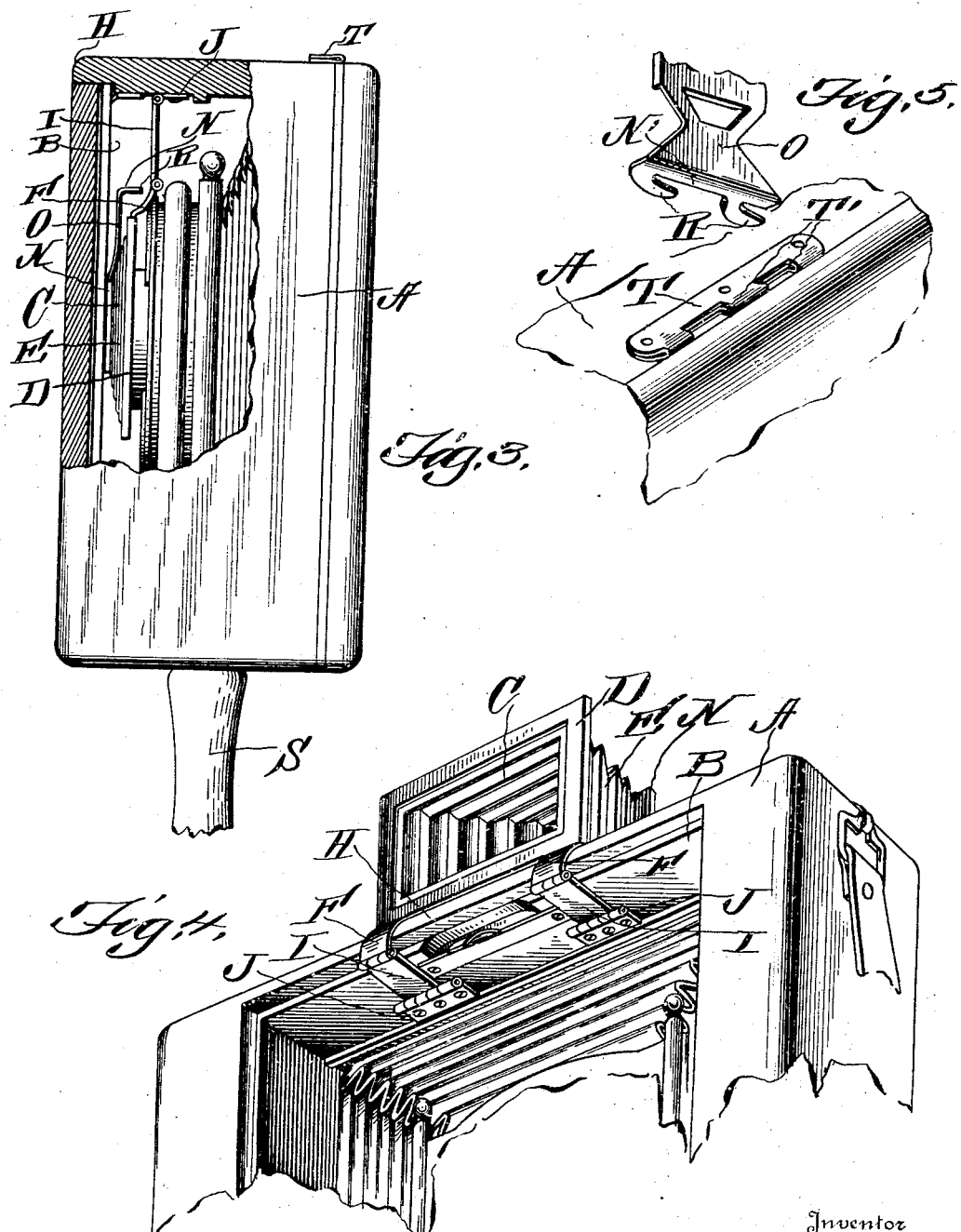

UNITED STATES PATENT OFFICE.

ARTHUR DAVID NORTHRUP, OF ROCHESTER, NEW YORK.

FINDER ATTACHMENT FOR FOLDING CAMERAS.

1,264,842.  Specification of Letters Patent.  Patented Apr. 30, 1918.

Application filed September 25, 1917. Serial No. 193,166.

*To all whom it may concern:*

Be it known that ARTHUR D. NORTHRUP, a citizen of the United States, residing at Rochester, in the county of Monroe and State of New York, has invented certain new and useful Improvements in Finder Attachments for Folding Cameras; and he does hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in finder attachments for folding cameras and consists of a simple and efficient device of this nature so arranged that a person may conveniently take a picture while standing in a crowd, by holding the instrument so that it will have an unobstructed view over the heads of the people and objects, and so arranged that the person using the same may look directly at the object before him, the image appearing upon the finder being the same as it appears upon the finished picture.

The invention consists of a simple and efficient device so arranged that the same may be conveniently folded within the camera when not in use and readily opened up when it is desired to take the photograph.

The invention consists of various details of construction, combinations and arrangements of parts which will be hereinafter fully described, shown in the accompanying drawings and then specifically defined in the appended claims.

I illustrate my invention in the accompanying drawings, which with the letters of reference marked thereon, form a part of this application, and in which:

Figure 1 is a view of the device applied to a camera and open for use.

Fig. 2 is a top plan view of the finder.

Fig. 3 is a sectional view on line 3—3 of Fig. 2.

Fig. 4 is a view of the under surface of the top of the camera box to which the finder is attached.

Reference now being had to the details of the drawings by letters:

A designates a camera box having an opening B to receive the bellows and the door to which the bellows is adjustably connected. C designates a finder having a rectangular frame D at its large end, having flanges which are bent upon the frame and adapted to hold the large end of the bellows E thereto.

Said frame D has curved lugs F projecting therefrom and which are adapted to engage over the edge H of the camera box when the finder is adjusted for use. Double action hinges have links I which are pivoted to said lugs at corresponding ends and their other ends are pivotally connected to the plates J secured to the under surface of the top of the camera, as shown clearly in the drawings. The tapering end of the bellows is connected to the rectangular frame N, having flanges which are bent upon themselves to engage and hold the adjacent end of the bellows in the same manner as the latter is attached to the frame D. Said frame N has a projecting portion O, formed as shown in the drawings, and having a right-angled flange N′ with integral hooks R projecting therefrom. Fastened to the top of the box is a plate T bent upon itself at its longitudinal center and provided with slots T′ in the bent portion thereof, said slots being adapted to be engaged by the integral hooks upon the flange N′, when the finder is adjusted for use.

When it is desired to hold the finder, the frame N having integral hooks is moved laterally sufficient to permit the hooks to disengage the slots T′, after which the bellows may be folded and the double hinged connections with the bellows will permit the latter to swing inside the camera and rest over the lens of the instrument and which will not interfere with the closing of the door in the usual manner. A handle S having a threaded portion S′ at one end is adapted to be fitted in the threaded aperture in the bottom of the camera which is provided with the usual tripod screw and which affords means for holding the camera so that the person focusing the same may hold the finder opposite the eye, thus affording an unobstructed vision and adapting the attachment for convenient use in taking a photograph while standing back in a crowd.

By the provision of a finder of the nature shown, the field which appears upon the finder will be similar to that produced upon the finished picture. As the finder is always in focus the picture may be quickly located.

What I claim to be new is:

1. A finder attachment for folding cameras, comprising a bellows with frames at the ends thereof, one frame being adapted to be hinged to the inner face of the camera, and means upon the other frame for attaching the same to the outer face of the camera.

2. A finder attachment for folding cameras, comprising a bellows with frames at the ends thereof, one frame being adapted to be hinged to the inner face of the camera, hooks upon the other frame, a plate adapted for attachment to the outer face of the camera and designed to receive said hooks.

3. A finder attachment for folding cameras, comprising in combination with a camera box, a bellows having frames at the ends thereof, a double hinged connection between one frame and the inner face of the top of the camera box, the other frame having an angled projection with integral hooks, a plate for attachment to the outer face of the camera box and designed to receive said hooks.

4. A finder attachment for folding cameras, comprising in combination with a camera box, a bellows, frames attached one to each end, one of said frames having integral lugs designed to engage over the edge of an opening in the box, and double hinged connections between said lugs and the inner face of the top of the box, the other frame having a projection with an angled flange provided with integral hooks, a slotted plate for attachment to the outer face of the box adapted to receive said hooks.

In testimony whereof I hereunto affix my signature in presence of two witnesses.

ARTHUR DAVID NORTHRUP.

Witnesses:
EARLE R. L. BURPEE,
CHARLES E. GANYLER.

Copies of this patent may be obtained for five cents each, by addressing the "Commissioner of Patents, Washington, D. C."